Nov. 7, 1950     H. E. SEBESTA     2,528,670
HAY HOIST BOOM
Filed Feb. 27, 1947     2 Sheets-Sheet 1
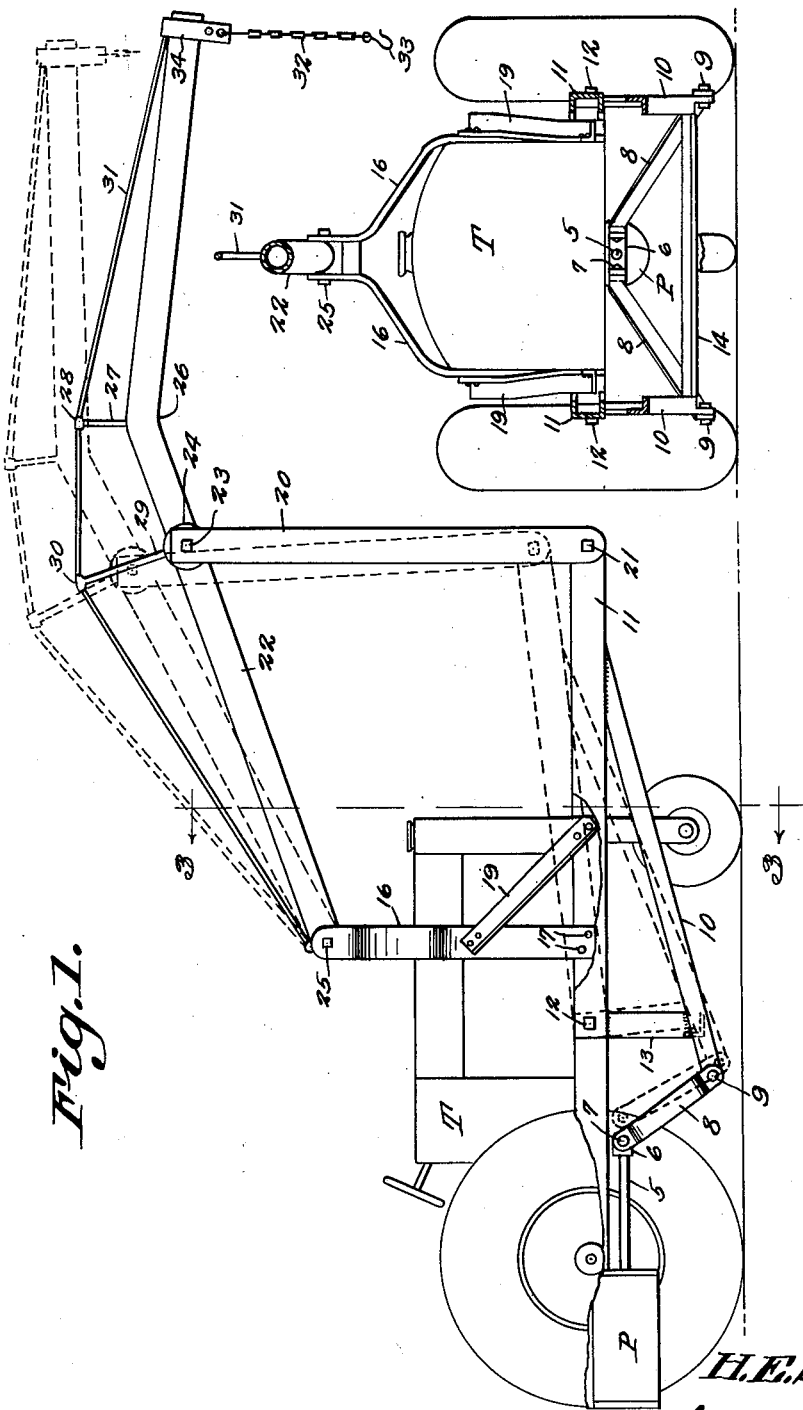
Inventor
H. E. Sebesta
By Knowles
Attorneys.

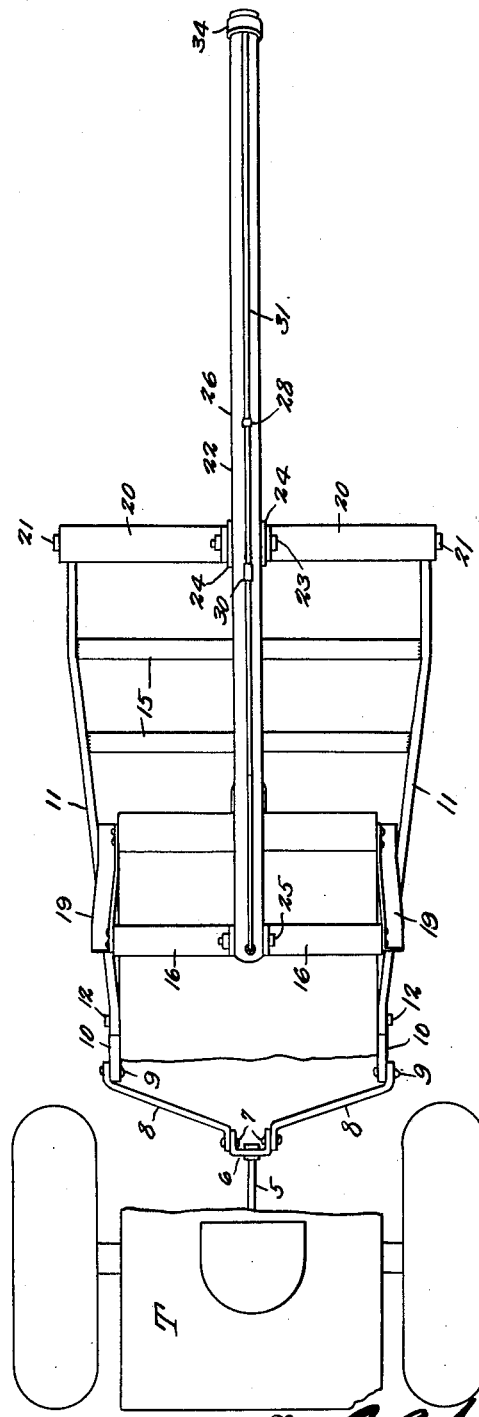

Patented Nov. 7, 1950

2,528,670

UNITED STATES PATENT OFFICE 2,528,670

HAY HOIST BOOM

Harvey E. Sebesta, Wilson, Kans.

Application February 27, 1947, Serial No. 731,342

1 Claim. (Cl. 254—139.1)

This invention relates to hay hoist booms, and more particularly, has reference to a device of this character which can be conveniently mounted upon hydraulic loader attachments for tractors.

The primary object of the invention resides in the provision of a boom attachment of the type described that is of novel construction, and is unusually versatile in reference to the lifting functions which it is adapted to perform.

Another important object of the invention is to provide a boom which, though inexpensive, is exceptionally durable, being constructed of relatively few parts, simply arranged.

A further object of the invention is to provide a boom that can be readily mounted upon a tractor, and upon the loader arms of a conventionally formed hydraulically operated loading attachment, such as are commonly used in loading manure, being attached to the tractor for this purpose.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Figure 1 is a side elevational view of a tractor and of a hay hoist boom constructed in accordance with the invention, mounted thereon, parts being broken away, the dotted lines indicating the position taken by the boom when it is raised in lifting operations.

Figure 2 is a top plan view, parts being broken away.

Figure 3 is a view taken substantially on line 3—3 of Figure 1.

Referring to the drawings in detail, T designates a tractor, and P a hydraulic power means, that is mounted on the tractor intermediate the rear wheels thereof.

The hydraulic power means P is adapted to drive the piston rod 5, which is movable forwardly and rearwardly, longitudinally of the tractor T. The front end of the piston rod 5 is provided with a U-shaped bracket 6. To the forwardly extended arms of the bracket 6 are pivotally connected, as at 7, the rear ends of lever arms 8. As clearly shown by Figures 1 and 2, the lever arms 8 are extended in a forward direction from the piston rod 5, being so extended downwardly and at an oblique angle relative to the piston rod.

The lever arms 8 are extended from their point of pivotal connections 7 in widely diverging relation. At their forward ends, they are pivotally joined at 9 to the rear ends of elongated supporting arms 10. These are extended upwardly and obliquely from their rear ends, along the sides of the tractor, and are fixedly secured, as by welding, at their front ends to the main loader arms 11. They are so secured to the main loader arms 11 adjacent the front ends of the loader arms.

At their rear ends, the main loader arms 11 are pivotally connected, as by bolts 12, to the body of the tractor T. Brace arms 13 are fixedly secured at one end to the rear ends of the main loader arms 11, and are downwardly extended being fixedly secured at their other ends to the supporting arms 10, adjacent the rear ends of the supporting arms.

A transverse brace 14 rigidly connects the supporting arms 10 adjacent their rear ends, and transverse braces 15 rigidly connect the main loader arms 11 forwardly of the tractor T.

All the above designated parts, and the particular arrangement thereof which has been described, are known in the art to which the invention appertains, and constitute no part of the present invention.

On each side of the frame of the tractor T, there is rigidly connected to the frame the lower ends of strap irons 16, which may be connected to the tractor by any suitable means, as by bolts 17. These are extended upwardly from their lower ends, and above the hood of the tractor, are inclined toward each other in converging relation to a point adjacent their upper ends. Thus, the strap irons together define a support in the shape of an inverted U. The upper ends of the strap irons 16 are extended upwardly in spaced parallel relation, as clearly shown by Figure 3. The upper ends of the strap irons 16 are rigidly connected in spaced relation by a short transverse brace 18. Rigidly supporting the strap irons 16 in proper position are angle irons 19, which are connected at one end to the strap irons intermediate the ends of the strap irons, and which are connected at their other end to the frame of the tractor T, thereby bracing the strap irons 16 against movement relative to the tractor T, either in a forward or rearward direction.

To the front ends of the main loader arms 11 are pivotally connected the lower ends of lifting arms 20, by means of bolts 21 or the like. The lifting arms 20 are extended upwardly from their lower ends in converging relation, the upper ends thereof being spaced apart to receive between them the boom 22. The lifting arms together define a support formed as an inverted U. The boom 22 is pivotally joined to the upper ends of the lifting arms 20, intermediate the ends of the boom, a bolt 23 being provided for this purpose. Preferably, washers 24 or the like are interposed between the upper ends of the lifting arms 20 and the boom 22. A bolt 25 pivotally connects the rear end of the boom 22 to the upper ends of the strap irons 16. The lifting arms 20 are extended upwardly a somewhat greater distance than are the strap irons 16. As a result, even in normal position, the boom 22 is inclined upwardly at an angle from its rear end. A short distance forward of its point of connection to the lifting arms 20, the upward direction taken by the boom 22 is terminated by a bend 26 in the boom, the boom being extended from the bend 26 to its front end at a slight downward angle, this construction being shown clearly in Figure 1. As a result of this formation of the boom 22, when the front end of the boom is raised a considerable distance in lifting a load depending therefrom, the load will not tend to swing rearwardly toward the other end of the boom.

As an overhead brace structure for strengthening the boom 22 during the lifting of heavy loads, I provide a relatively short brace rod support 27 that is rigidly joined to the boom 22 at its lower end, and is upwardly extended therefrom, being provided at its upper end with a pipe sleeve 28. I also provide another somewhat longer brace rod support 29, that extends upwardly from the boom 22 rearward of the support 27. The support 29 is provided at its upper end with pipe sleeve 30. Through the pipe sleeves 28 and 30 is extended an elongated brace rod 31. This is rigidly connected by any suitable means at its front and rear ends, to the front and rear ends of the boom 22, respectively.

From the front end of the boom 22 is suspended a flexible load engaging means, which is preferably in the form of a chain 32 having at its lower end a hook 33. This is fixedly connected to the front end of the boom 22 by any suitable means, as by welding, or alternatively, it may depend from a clamping sleeve 34, which may itself be welded to the front ends of the brace rod 31 and boom 22.

It is understood that the chain 32 and hook 33 may be used to engage heavy articles, slings, or the like.

By reference to the dotted line positions shown in Figure 1, the operation of the apparatus will become clear. As the piston rod 5 is thrust forwardly, the lever arms 8 act to move the supporting arms 10 forwardly and upwardly, with the result that the main loader arms 11 pivot on the bolts 12, and are swung upwardly at their front ends. The lifting arms 20 thereby are caused to raise the front end of the boom 22 a desired amount, the boom 22 pivoting on its rear end, on the bolt 25.

It has been found through experience gained from actual tests of apparatus constructed in accordance with the invention, that the apparatus is unusually adapted to raise heavy loads very easily. It has been found to be particularly useful in stacking hay, straw, and the like, and to move these materials from stacks to wagons, or to the ground.

What is claimed is:

The combination, with tractor-mounted loader arms connected pivotally at their rear ends to the tractor for swinging in a vertical plane, of a hoist attachment mounted on said arms and including a pair of supports each shaped as an inverted U, one of said supports rigidly connected to the loader arms adjacent said pivotal connection, and the other support pivotally connected to the front ends of the loader arm, a boom pivotally connected at its rear end to the first-named support and pivotally connected intermediate its ends to the second-named support, and load-engaging means suspended from the front end of the boom.

HARVEY E. SEBESTA.

REFERENCES CITED

The following references are of record in the file of this patent:

UNITED STATES PATENTS

| Number | Name | Date |
|---|---|---|
| 1,673,307 | Best | June 12, 1928 |
| 2,347,822 | Goldup | May 2, 1944 |
| 2,433,086 | Borgelt | Dec. 23, 1947 |

FOREIGN PATENTS

| Number | Country | Date |
|---|---|---|
| 158,686 | Switzerland | Nov. 30, 1932 |